United States Patent [19]

Da Silva

[11] Patent Number: 4,875,509
[45] Date of Patent: Oct. 24, 1989

[54] AIR PUMP PRESSURE CONTROL SYSTEM FOR INFLATING PAIRS OF AUTOMOTIVE TIRES

[75] Inventor: Jean Da Silva, Le Gardeur, Canada

[73] Assignee: E.R.C.D. Industries Inc., Montreal, Canada

[21] Appl. No.: 156,444

[22] Filed: Feb. 16, 1988

[51] Int. Cl.$^4$ ............................................. B60C 23/10
[52] U.S. Cl. ........................................ 141/38; 141/83; 141/94; 141/98; 116/266; 152/415; 73/146.2; 137/227; 137/228
[58] Field of Search ................... 141/1, 7, 4, 38, 65, 141/66, 98, 83, 94, 95, 230; 116/266; 137/1, 2, 227, 228, 231, 223; 152/415–417; 73/146, 146.2, 146.3, 146.4, 146.5, 146.8

[56] References Cited

U.S. PATENT DOCUMENTS

| | | | |
|---|---|---|---|
| 2,634,783 | 4/1953 | Turek et al. | 152/417 |
| 2,715,430 | 8/1955 | Lindeman | 152/417 X |
| 2,849,047 | 8/1958 | Lamont et al. | 152/417 |
| 3,335,766 | 8/1967 | Winger | 141/38 |
| 4,166,396 | 9/1979 | Baker | 73/706 |
| 4,421,151 | 12/1983 | Stumpe | 152/417 |
| 4,694,409 | 9/1987 | Lehman | 73/146.8 X |
| 4,763,709 | 8/1988 | Scholer | 152/416 |

FOREIGN PATENT DOCUMENTS

| | | | |
|---|---|---|---|
| 559154 | 7/1957 | Belgium | 141/38 |
| 702416 | 1/1965 | Canada | 141/38 |
| 1302014 | 7/1961 | France | 141/38 |
| 399930 | 4/1966 | Switzerland | 141/38 |
| 1164080 | 6/1985 | U.S.S.R. | 137/224 |

Primary Examiner—Ernest G. Cusick

[57] ABSTRACT

An air pressure control system for verifying and adjusting air pressure, simultaneously, in a pair of vehicle tires, either the pair of front tires or the pair of rear tires or any individual tire. The system comprises a pair of air conduits having tire valve connectors at a free end thereof for connecting the conduits to respective one of a pair of vehicle tires. The conduits are interconnected together at a junction to equilibrate air pressure in the pair of tires. An air pressure source is also provided. A valve connects the air pressure source to the junction, in an inflating mode, to inflate the tires. Another valve also connects the junction to outside atmosphere, in a deflating mode, to evacuate air from the tires. A pressure sensor is connected in association with the valves and the junction to display the air pressure equilibrated between the pair of tires. A display device visually indicates the equilibrated pressure at the junction to determine if the valves should be actuated and in which mode.

3 Claims, 1 Drawing Sheet

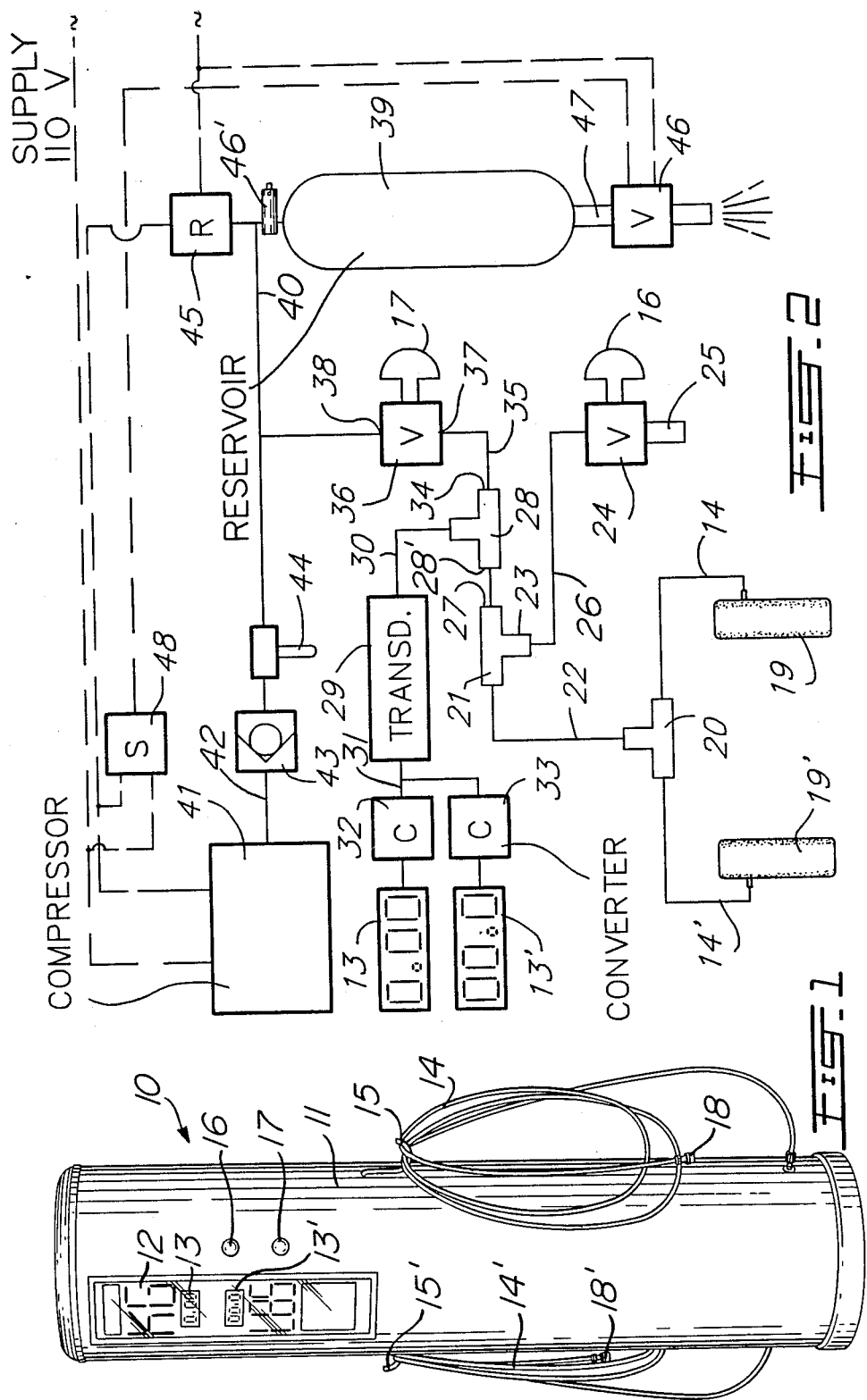

AIR PUMP PRESSURE CONTROL SYSTEM FOR INFLATING PAIRS OF AUTOMOTIVE TIRES

BACKGROUND OF INVENTION

The present invention relates to an air pressure control system and method for verifying and adjusting air pressure, simultaneously, in a pair of vehicle tires. Either the pair of front tires or the pair of rear tires or any individual tire.

FIELD OF INVENTION

A well known device for providing air pressure for inflating vehicle tires contains a compressor connected to a small housing mounted in a wall. The housing is provided with a numerical display. This numerical display is normally of the "tumbler-type" and is actuable by a crank whereby to rotate the drums can be rotated to indicate a desired air pressure. An air hose is also provided with the housing and air is be pumped in the hose when connected to a single tire to deliver the set desired air pressure. This is probably the most common device that has been utilized in service stations, to date.

DESCRIPTION OF PRIOR ART

It is a feature of the present invention to provide an improved air pressure control system for verifying and adjusting air pressure, simultaneously, in a pair of vehicle tires.

Another feature of the present invention is to provide an improved method of verifying and adjusting air pressure, simultaneously, in a pair of vehicle tires.

Another feature of the present invention is to provide an air pressure control system and method for verifying and adjusting air pressure, simultaneously, in a pair of vehicle tires and wherein the air and the pair of tires is equilibrated automatically and visually displayed whereby a decision can be made by the user add or remove air from both tires, simultaneously.

SUMMARY OF INVENTION

According to the above feature, from a broad aspect, the present invention provides an air pressure control system for verifying and adjusting air pressure, simultaneously, in a pair of vehicle tires. The system comprises a pair of air conduits having tire valve connectors at a free end thereof for connecting the conduits to respective one of a pair of vehicle tires. The conduits are interconnected together at a junction to equilibrate air pressure in the pair of tires. An air pressure source is also provided. Valve means connects the pressure source to the junction in an inflating mode to inflate the tires and to evacuate air from the tires in a deflating mode. Pressure sensing means is connected in association with the valve means and the junction to display the air pressure equilibrated between the pair of tires. Display means is provided to visually indicate the equilibrated pressure at the junction to determine if the valve means should be actuated and in which mode it should be placed at.

According to a further broad aspect of the present invention, there is provided a method of verifying and adjusting air pressure, simultaneously, in a pair of vehicle tires or a single tire. The method comprises the steps of connecting a pair of air conduits to respective one of a pair of vehicle tires. Air pressure in the tires is automatically equilibrated through an interconnection of the air conduit at a junction. Air pressure at the junction is displayed on a display device. An air pressure source is provided and connected to the junction through a valve to increase air pressure at the junction and in the tires when desired or evacuate air pressure from the junction and from the said tires.

DESCRIPTION OF DRAWINGS

A preferred embodiment of the present invention will now be described with reference to the example thereof, as illustrated in the accompanying drawings, in which:

FIG. 1 is a perspective view of the air pressure system of the present invention; and FIG. 2 is a schematic diagram of the system.

DESCRIPTION OF PREFERRED EMBODIMENT

FIG. 1 is a perspective view of the housing containing the air pressure control system of the present invention for verifying and adjusting air pressure, simultaneously, in a pair of vehicle tires. The housing is generally identified by reference numeral 10 as consisting of a vertically extending cylindrical casing 11 having a window 12 therein provided with two numerical display windows 13 and 13' for displaying air pressure in the Metric and British system. A pair of air hoses or conduits 14 and 14' are supported on hooks 15 and 15' and utilized to connect a pair of vehicle tires for inflating same. A first switch push-button 16 is provided on the housing to evacuate air from the pair of tires connected to the air hoses 14 and 14'. A second switch push-button 17 is provided to add inflating pressure to the tires connected to the air hoses. Each of the air hoses is provided with a tire valve connector 18 and 18' at a respective free end thereof.

Referring now to FIG. 2, there is shown the air pressure control system of the present invention. As herein shown, the air hoses 14 and 14' are connected recpectively to the valve connector (not shown but well known in the art), of respective ones of a pair of vehicle tires 19 and 19', and preferably, but not exclusively, a diagonal pair of tires.

The conduits 14 and 14' are herein shown connected to a three-way connector 20, herein constituting a junction through which the conduits 14 and 14' communicate with one another whereby air in both tires are automatically equilibrated to a common air pressure. This junction 20 is then connected to a second three-way junction connector 21 via a conduit 22. The connector 21 has an outlet port 23 thereof connected to the evacuation valve 24 to which the push-button switch 16 is connected whereby to evacuate air from the junction connector 20, and hence the tires 19 and 19'. This is done by depressing the push-button 16 so that air may escape through the outlet 25 in communication with outside atmosphere. This evacuation valve 24 is connected to the three-way connector 23 via conduit 26. The other outlet port 27 of the three-way connector is connected to the inlet port 28' of a further three-way connector 28.

The second three-way connector 28 has one outlet port connected to a transducer device 29 through a conduit 30. The transducer 29 converts the air pressure at the input thereof into an electrical signal which it generates at the output 31 thereof. This output signal is connected to a first and second converter 32 and 33 with each converter being connected to respective one of the numerical display windows 13 and 13' to display a digital value by means of liquid crystals. The converter 32 converts the output electrical signal at the output 31 into a metric display and displays a number of kilograms per centimeter square. The other converter 33 converts the output electrical signal at the output 31 into the English measure and displays a number in pounds per square inch, to a precision of 1/10 of a pound.

The other output of the second three-way connector 28, namely output 24, is connected via a conduit 35 to the output 37 of another valve 36 to which the push-button 17 is connected. Both the valve 24 and 36 are normally closed valves and are opened when their push-buttons are depressed.

The input 38 of valve 36 is connected to a pressure reservoir 39 through conduit 40.

The reservoir is herein shown and is pressurized to 100 pounds pressure by means of a compressor 41 connected thereto via conduit 42. A check-valve 43 is connected in the conduit 42 between the compressor and the reservoir in order to provide uni-directional flow from the compressor to the reservoir. A filter 44 removes condensation from the compressed air at the output of the compressor 41. A safety valve 46' release air when the pressure in the reservoir exceeds 110 lbs.

As herein shown, a pressure sensing switch 45 is also connected to a purge valve 46 connected to the bottom connection 47 of the reservoir to sense the pressure therein and to operate the compressor when the pressure in the reservoir drops below a predetermined value, herein 80 pounds per square inch. The purge valve 46 is operated by a switch means, herein relay 48, each time the compressor is operated. The relay 48 provides only an instantenous signal to the valve whereby to open same for a very short period of time whereby to evacuate any water that is accumulated at the bottom of the reservoir by condensation.

It is pointed out that the inlet 38 of the valve 36 may be connected directly to the compressor and a reservoir need not be provided.

Briefly, summarizing the method, it consists in connecting a pair of air conduits 14 and 14' to respective one of a front or rear pair of vehicle tires 19 and 19'. Air pressure is automatically equilibrated between the tires through the junction 20 and the equilibrated air pressure at that junction is displayed on the display windows 13 and 13'. If the equilibrated air pressure between the tires 19 and 19' is below a desired value, then push-button 17 is depressed on the housing 11 and air pressure is directed to the junction 20 and the tires 19 and 19' and simultaneously, the increase in pressure at the junction 20 is displayed on the windows 13 and 13'. When the desired air pressure is reached on the window, the push-button 17 is released manually.

If the air pressure at the junction 20 was above a desired value, as indicated on the displays 13 and 13', then the push-button 16 is depressed thereby evacuating air from the junction and both tires until the display windows display the numerical value of the desired air pressure. The push-button 16 will then be released manually. The reservoir 39 always maintains sufficient air pressure therein and this is done automatically by a pressure sensing switch 45 which operates the compressor 41 connected to the reservoir. Alternatively, any compressor can be connected and disconnected from the reservoir to add air pressure thereto.

It is within the ambit of the present invention to cover any obvious modifications of the example of the preferred embodiment as described therein, provided such modifications fall within the scope of the appended claims.

I claim:

1. An air pressure control system for verifying and adjusting air pressure simultaneously in a pair of vehicle tires, said system comprising a pair of air conduits having valve connectors at a free end thereof for connecting said conduits to a respective one of a pair of vehicle tires, said conduits being interconnected together at a junction to equilibrate air pressure in said pair of tires, an air pressure reservoir having air under pressure stored therein, a compressor feeding said reservoir, said compressor being operated by a pressure switch connected to said reservoir when air pressure in said reservoir drops below a predetermined level, a purge valve connected to said reservoir to evacuate water condensate within said reservoir, said purge valve being operated momentarily by switch means connected to said compressor actuated each time said compressor is operated, valve means connecting said air pressure reservoir to said junction in an inflating mode to inflate said tires and to evacuate air from said tires in a deflating mode, said valve means being comprised of a first normally closed valve interconnected between said junction and said pressure reservoir to direct air pressure to said junction and both said tires of said pair of tires, and a second normally closed valve interconnected between said junction and outside atmosphere to evacuate air from said junction and said pair of tires, and pressure sensing means in the form of a transducer and connected to a conduit between said first and second valves, connected in association with said valve means and said junction to convert pressure sensed at said junction into an electrical signal to be representative of the air pressure equilibrated between said pair of tires, display means connected to said transducer to visually indicate said equilibrated pressure at said junction to determine if said valve means should be actuated and in which mode it should be placed at.

2. An air pressure control system as claimed in claim 1 wherein said display means is a visual display device indicating the pressure sensed by said transducer.

3. An air pressure control system as claimed in claim 1, wherein said pair of vehicle tires is either a pair of front tires or a pair of rear tires.

* * * * *